UNITED STATES PATENT OFFICE.

JOHN P. TOWNSEND, OF NEW YORK, N. Y., ASSIGNOR TO TAPPEN TOWNSEND, OF BROOKLYN, N. Y., AND CHARLES SEARS, OF MIDDLETOWN, N. J.

IMPROVEMENT IN THE MANUFACTURE OF DRY MOLDS FOR CASTINGS, &c.

Specification forming part of Letters Patent No. 43,885, dated August 16, 1864; antedated August 4, 1864.

*To all whom it may concern:*

Be it known that I, JOHN P. TOWNSEND, of the city and county of New York, in the State of New York, have invented a new and improved composition for making durable dry molds for casting metals in and for making retorts, crucibles, pots for melting metals and glass in, and other uses, of which the following is a specification.

The nature of my invention consists in preparing a composition of certain well-known mineral substances and forming thereof highly inflexible and impermeable molds for metallic castings, and retorts, pots, crucibles, &c., for melting metals, for making glass, and for all such uses as vessels or molds of this description are required; and it further consists in applying a certain infusible glazing to the surface of said vessels or molds where circumstances may require the use of such a coating or glazing.

The materials I use in the manufacture of these molds are fire-clay, soapstone, and umber. The two first-named materials are highly inflexible, resisting the highest heat of our furnaces; but however carefully prepared from the best and finest materials, when dry, and particularly when baked or burned, they still retain a certain degree of porosity in their substance, which gives a place for the absorption and lodgment of moisture, air, or gases, bringing on rapid destruction from their alternate expansion and contraction, besides which this permeability causes pots, crucibles, and other vessels made of these materials to suffer rapidly from some of the metallic oxides—such as those of lead—when melted in them. It is to remove the porosity as far as possible, and to give a character of impermeability to the mass, that I use umber in my composition. This mineral, fusing at a moderately-high temperature, permeates the whole mass when exposed to a high temperature, expelling the air, gases, and moisture occupying their place, and thus giving to the whole mass a degree of solidity and impermeability in the highest degree advantageous to the permanency of the mold. It is well known that clay of all kinds undergoes some contraction from heat; but in this composition it seems only sufficient to allow the fused umber to fill up the interstices, as molds made in proper proportions of these constituents shrink from the highest heat scarcely an appreciable degree, leaving the mass of remarkable compactness and closeness of texture, with a slight aspect of vitrifaction on the surface and great density and strength throughout. In consequence of this molds and crucibles made in this way may be used with proper care almost an indefinite number of times. Castings made in these molds, and particularly such as are faced with glazing, hereinafter described, need no cleaning, as there is no adhering sand nor sand-holes left in or on the castings, nor is there any vitreous coating, so common on metals cast in sand-molds, and which is so destructive to the machinist's tools.

My experience indicates that metal, particularly cast-iron, is softer and of more uniform texture, resembling malleable cast-iron, when cast in these molds than that produced from sand or even metallic molds, and they may arise from the absence of moisture in the mold, as well as from its being a comparatively-bad conductor of heat, consequently allowing the fused metal to cool slowly, without interference with the molecular attraction of atoms in assuming the solid state.

I find it necessary to vary the proportions of the materials to suit the different purposes to which the mold or vessel is to be applied, using sometimes more clay than soapstone, at other times more soapstone than clay; but in all cases taking care not to use so much of the umber as may cause the other materials to soften or melt at a temperature below that to which the mold or vessel must necessarily be exposed. I have found that two parts of fire-clay, two of soapstone, and one of umber make an excellent composition. In other cases I have used two parts of clay and three of soapstone, or three of clay and two of soapstone, with as low as one-tenth or one-twelfth of umber. These latter proportions appear the best where the vessel is to be exposed to a very high temperature, as in making glass. These proportions are by weight.

In preparing the molds or vessels for use they be made entire or be built up of separate smaller masses previously fashioned to produce the form required. In all cases the vessel or mold, whether made entire or in separate parts, should be thoroughly dried before being used. When the castings to be made are thin and the pressure not very great upon the sides of the mold, the composition, or, rather, mold, may be used in this dried state; but when large castings are to be made, or the vessel or mold to be exposed to a high temperature, as in crucibles, glass-house pots, and the like, the vessel or mold should be well baked before use.

In preparing this composition I reduce the soapstone and umber as nearly as possible to impalpable powders and combine them thoroughly and carefully with the clay, using only so much water as may be necessary to do this and give the entire mass the proper degree of plasticity to be converted into the molds or forms required.

It is usual in foundries, machine-shops, &c., where metallic casting is done, to cover the face of the mold with finely-powdered charcoal, plumbago, anthracite, or soapstone, to prevent the adhesion of the metal to the mold. In some cases these materials are applied as a wash by mixing them up in water. In either case the effect is the same, as the water is soon absorbed by the mold or evaporates spontaneously, or is made to evaporate on the first application of heat, leaving these materials on the face of the mold in the same condition physically they would have been if applied in a dry state. In this condition these powders are easily removed from the surface of the mold, and experience shows that when they are so constituted as to stand several castings the powder has to be reapplied after each casting. This is troublesome, and often inconvenient, and renders it very desirable that these materials, when required, should be put on so as to remain permanent. I have discovered that this can be done by mixing the plumbago or its equivalent with a paste made of wheat-flour and water, or of any other equivalent flour and water that will make a paste such as is commonly made from these materials by bookbinders, paper-hangers, &c., except that I prefer making it a little thinner. In this paste I carefully rub up as much very fine plumbago as will make the whole a thick pasty mass, and with this plaster the inner and if necessary, also the outer, face of the mold, pot, or crucible, taking care to rub it well in, so as to fill up completely all the pores, cracks, and interstices of these vessels or molds, covering the whole surface smoothly and of nearly a uniform thickness as possible. When this is dried or baked properly it presents a smooth shining surface, adhering closely and with great tenacity to the composition of the body of the mold or vessel, and of course giving a casting with a like surface that need little or no further preparation for use or market.

Crucibles and pots made in the above-described manner and with my improved facing or glazing are as refractory, or nearly so, as those made of plumbago, and possess many advantages over them. Plumbago, it is known, is highly diathermanous, in consequence of which metals that have been fused in them cool with rapidity when removed from the furnace and exposed. This is not the case with the composition of which I make the body of my vessels of that kind. Although not, perhaps, athermanous, it transmits heat very slowly. Consequently metal will remain much longer in it in a fixed state when exposed than in plumbago vessels, giving the workmen more time to perform their duty carefully, and securing the free and even flow of the metal into the mold from its steady and well maintained fluidity. Moreover, my crucibles and pots are much cheaper than those of plumbago, and, from the highly-plastic, nature of the materials, may be made of any form or size.

I have found, also, that fire-clay and soapstone, with or without a small addition of quartz sand—say two parts of fire-clay, one part soapstone, with or without one part of quartz sand, prepared, as above described, for the body of the mold, crucible or pot—answers often very well for such molds, crucibles, and like articles, particularly for common castings.

Having thus fully set forth the nature of my invention, what I claim, and desire to secure by Letters Patent of the United States, is—

1. Making durable dry molds for casting metals in, crucibles, pots, and like articles of a composition of fire clay, soapstone, and umber, in the manner and proportions of materials, substantially as described, whether the said mold, crucible, or like articles be made in one or several pieces.

2. The composition of plumbago and paste and their equivalents for making the facing or glazing of dry molds, crucibles, pots, and the like articles, as described.

3. The manufacture and use of molds, crucibles, pots, and the like articles made of fire-clay and soapstone, with or without a portion of quartz sand, substantially as described.

JOHN P. TOWNSEND.

Witnesses:
J. P. TOWNSEND,
W. C. GOULD.